Inventor
Edward L. Bowles
by David Rines
Attorney

Nov. 23, 1937. E. L. BOWLES 2,099,923
METHOD AND MEANS FOR MEASURING DYNAMIC CHARACTERISTICS
Original Filed Aug. 15, 1923 2 Sheets-Sheet 2

Fig. 4.

Inventor
Edward L. Bowles
by David Rines
Attorney

Patented Nov. 23, 1937

2,099,923

UNITED STATES PATENT OFFICE 2,099,923

METHOD AND MEANS FOR MEASURING DYNAMIC CHARACTERISTICS

Edward Lindley Bowles, Wellesley Farms, Mass.

Original applications August 15, 1928, Serial Nos. 299,695 and 299,696. Divided and this application May 13, 1935, Serial No. 21,217

40 Claims. (Cl. 250—27)

The present invention relates to electric meters. The invention is more particularly concerned with the measurement of the dynamic coefficients of space-current devices, like vacuum tubes, and other electric instruments. The present application is a continuation in part of application Serial No. 171,238 filed February 26, 1927 and a division of applications Serial Nos. 299,695 and 299,696 filed August 15, 1928. These applications matured into Patents 2,031,923, 2,031,924 and 2,031,925, respectively on February 25, 1936.

Included within the term "dynamic characteristics" of a vacuum tube are the amplification coefficient, commonly denoted by $\mu$, the internal plate resistance $r_p$, or other dynamic electrode resistance, and the mutual or trans-conductance $g_m$. In the case of a three-electrode vacuum tube, as is well known, these dynamic characteristics are differential functions of the plate and grid voltages and the plate current of the tube. Although the three-electrode tube is used for illustration, it is of course understood that these dynamic characteristics are not limited to three-electrode tubes but may be applied to any appropriate multi-electrode tubes. Although the dynamic coefficients of the tubes are obtainable from the static curves or plots of the appropriate quantities, it is only by very awkward and inaccurate methods involving manual adjustment of direct-current resistances or other devices and interpretation of incremental variations of current. The amplification coefficient is given as the slope of the plate-voltage, grid-voltage characteristic of a vacuum tube; the dynamic, internal-plate resistance is given as the slope of the plate-voltage, plate-current characteristic (when plate volts are plotted as ordinates); and the mutual conductance is given as the slope of the grid-voltage, plate-current characteristics. These dynamic characteristics, therefore, apply to any region of the corresponding characteristic, no matter what the curvature, or the rate of change of the slope. The alternating measuring voltage must necessarily, therefore, be small enough so that the current response resulting from this voltage is proportional to the voltage. Should the voltage be too large, this relationship between cause and effect would not be linear and the response would, therefore, not be a true indication of the desired dynamic coefficient. It is a recognized fact, in other words, that, in measuring any dynamic-tube coefficient, the alternating, measuring voltage must be so small that no appreciable harmonics amount to by-products which vitiate the results sought.

The chief object of the present invention is to simplify and improve upon present-day methods of and apparatus for measuring such quantities. Other objects will be explained hereinafter, and will be particularly pointed out in the appended claims, it being understood that it is intended to express in the claims all the novelty that the invention may possess.

The invention will be explained in connection with the accompanying drawings, in which.

To fix the ideas, let it be assumed that it is desired to measure the dynamic characteristics of each of a plurality of vacuum tubes 4, each having a plurality of electrodes, namely, a filament 6, a grid 8 and a plate 10. Once the measurement of the characteristics of this tube is understood, the measurement of other electrical devices such as tetrodes, pentodes, etc., will be equally clear; and though the description will proceed upon the basis that a particular tube 4 is had in mind, it will also be apparent that any number of such tubes or other devices may be connected in and out of circuit, one after another, for the purpose of measurement.

The tube 4 is connected with a source of alternating voltage 2, either directly or, preferably, through a transformer 20. The primary winding 22 of the transformer 20 is connected in circuit with the source 2, and the secondary winding 24 is connected in the grid or input circuit of the tube 4. The secondary winding 24 is shown shunted by a resistor or voltage divider 38. If a definite, constant, predetermined current is caused to traverse the resistor 38, then a definite predetermined voltage may be applied to or superposed on the grid 8 of the tube 4 under test by adjusting the slider 36 along this resistor 38. The magnitude of this predetermined voltage applied to or superposed on the grid 8 will, for a constant current in the resistor 38, be a function of the position of the slider 36.

As will hereinafter appear, it is desirable to apply or superpose the same constant voltage to the grids 8 of all tubes 4 under test, as this facilitates reading direct values of the dynamic characteristics upon a direct-current indicating instrument 12, such as a milliameter or galvanometer which responds to the rectified alternating component of voltage or current affecting the detecting or rectifying device 30. The use of a constant impressed alternating voltage is not, however, essential, for the readings of the meter 12 may be corrected by suitable calculations if known, variable voltages are applied to or superposed on the grids 8 of the various tubes under test. In fact, the use of known, variable voltages is sometimes desirable, for example, so that both low amplification and high amplification tubes may then be measured with the same instrument 12. In such cases, furthermore, the direct-current instrument 12 may, if desired, be provided with a plurality of differently graduated scales, each corresponding to a particular one of several impressed voltages upon the grid 8, or a given scale may be understood to apply to a given impressed voltage by the use of a constant multiplying factor depending upon the type of tube under test.

The output circuit of the tube 4 is coupled to the input of a non-linear circuit element such as a detector or rectifier tube 30 operating as a grid or plate rectifier and having a filament 42, a grid 44 and a plate 46. This non-linear circuit element, shown here in the form of a vacuum detector for illustration, rectifies the alternating component of plate or other electrode current in the vacuum tube under test, which is ultimately indicated on a meter 12.

Figure 2:
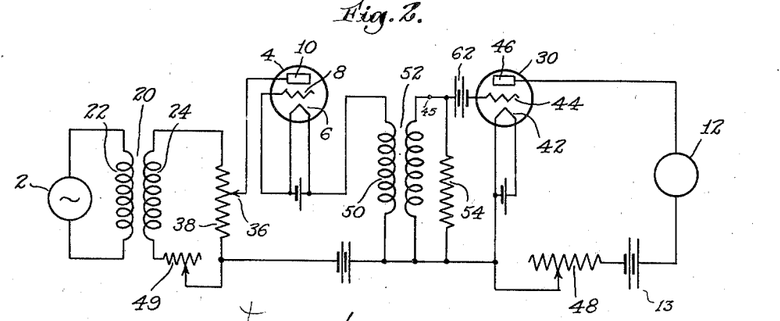
Figure 3:
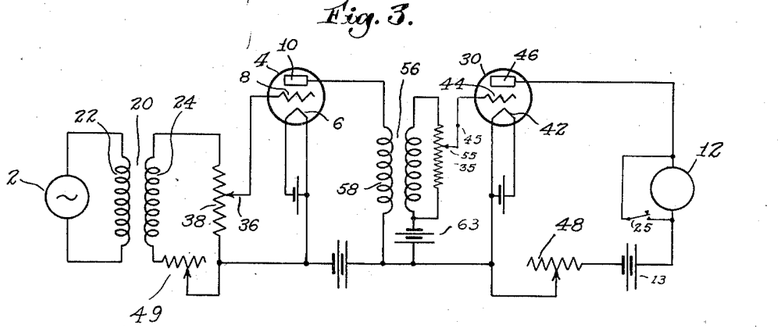

One or more stages of amplification between the tube 4 and the tube 30 may be employed, if desired. The coupling may be effected in any suitable manner, preferably, in Fig. 1 which illustrates the circuit connections for measuring the amplification coefficient $\mu$, through a coupling impedance 32, of impedance so high that the internal plate resistance of the tube 4 is negligible by comparison, in which case the voltage across it is independent of the dynamic internal plate resistance and therefore proportional only to the amplification coefficient $\mu$. The coupling may, on the other hand, be through a transformer 52 or 56, as in Figs. 2 and 3 respectively. If the primary input impedance of the winding 56 is negligible compared with the dynamic internal plate resistance of the tube 4 under test, the plate current of tube 4 is inversely proportional to its dynamic internal plate resistance $r_p$ and proportional to the alternating voltage appearing in the plate circuit. In Fig. 2 this alternating voltage will be that subtended on the divider 38 by the slider 36. In Fig. 3 the alternating plate voltage will be this subtended voltage multiplied by the amplification coefficient $\mu$.

A grid-leak resistor 34 and a condenser 28 make possible the operation of the tube 30 as a detector of the grid-rectification type. The grid-rectified current thus produced, that is, the rectified component of current resulting in the grid circuit of the tube 4 from the impressed alternating voltage, results in an amplified current change in the plate circuit of the tube 30 due to the change in voltage drop the rectified current produces in resistor 34. This current is transmitted to the direct-current indicating instrument 12.

The resistance of the leak resistor 34 may be of such value that the internal impedance from the grid 44 to the filament 42 is large by comparison. The rectifier or detector tube 30 may then be replaced by another tube without upsetting the characteristics of the same due to a change in the impedance seen by tube 4, in the circuits shown to the right of the impedance 32, and including the input impedance of the tube 30. By a judicious selection of resistance of the resistor 34 and of operating voltages of the tube 30, the relation of rectified current in the meter 12 to the alternating grid voltage may be varied.

Since different tubes of the same type may have dynamic characteristics of different values, the use of different tubes 30 will introduce variations in the readings of the meter 12 for the same, constant voltage applied to the tube 4, notwithstanding the use of a common input circuit and a common output circuit for the non-linear device 30, with substantially constant impedances in the common input and output circuits of the device. A variable resistor 48 may, therefore, be inserted in the output circuit of the device 30 to compensate for such differences, and so as to give the same reading in the meter 12, notwithstanding the fact that different devices 30 may be employed.

Figure 1:
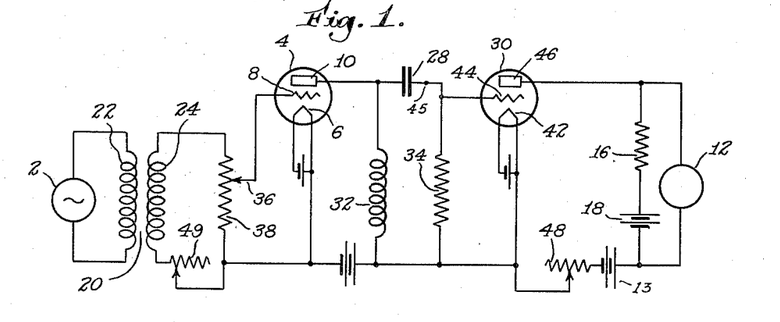
Figures 1, 2 and 3 are diagrammatic views of circuits and apparatus constructed and arranged, in accordance with a preferred embodiment of the present invention, to measure the amplification coefficient, the internal plate resistance and the mutual conductance, respectively and in any desired order, that is, in mutually exclusive fashion.

The non-linear device 30, shown for illustration as a detector or rectifier tube, if operated as a grid rectifier, as in Fig. 1, may have the steady or direct current balanced out of the meter 12, by means of the by-pass resistor 16 with its associated battery 18. If the resistance of the direct-current meter 12 is negligible compared with the resistance of the resistor 16 and if the battery 18 is adjusted so that the normal direct plate current of the detector tube 30 passes entirely through the resistor 16, then the meter 12 will only indicate changes in plate current brought about by grid detector action, that is, through grid rectification caused by the alternating voltage applied to the grid of the tube 30.

In Figs. 2 and 3, plate rectification is indicated in which, for example, the direct grid and plate voltages of the tube 30 may be made such that there is no current through the direct-current milliammeter or galvanometer 12 with no alternating voltage impressed on the grid of tube 30. The grid and plate batteries 62 and 13 respectively, may be adjusted for the desired character of detector operation. For example, these voltages 62 and 13 may be such that the plate current is just cut off with no alternating voltage present.

It is understood, of course, that either plate or grid rectification may be utilized in combination with the direct-current instrument 12 in any one of the figures—or in fact any other type of non-linear circuit or rectifier unit suited to the purpose may be so utilized.

A switch, not shown, may be inserted in the grid circuit at point 45 of the tube 30 to be manually or automatically kept open until the tube under test has been inserted and its plate current normal and opened before the plate circuit of the tube 4 under test is interrupted in removing it (the tube 4) from the socket. This obvious expedient will prevent any inductive effects due to the growth or decay of the plate current from affecting the instrument 12. This object may also be accomplished by connecting a short-circuiting switch 51 across the indicating instrument 12 as in Fig. 3.

It will first be assumed that a definite constant voltage is impressed upon the input circuit of all tubes 4 under test when they are successively connected with their common input circuit and their common output circuit before described.

The amplification coefficient may be measured or directly indicated by means of the circuit of Fig. 1, for, as already stated, the voltage across the impedance 32 is proportional to the alternating voltage applied to the grid and to the amplification coefficient of the tube. With constant voltage applied to the grid of the tubes 4 under test, the deflection of the meter 12 will be a function of the amplification coefficients $\mu$ alone of the tubes under test, other things remaining constant. Thus, the scale of the meter 12 may be calibrated to read $\mu$ directly.

In the operation of the system as thus far explained, therefore, a calibrated tube 4, having a definite, known amplification coefficient, is first inserted in the first stage of the device. As the dynamic characteristics of the detector tube 30 are not known, the resistor 48 or the resistor 49, or both, is adjusted until the indicating meter reads the value of the amplification coefficients of various tubes 4, and the meter 12 will indicate such amplification coefficients directly.

The dynamic internal plate resistance may be measured by means of the circuit shown in Fig. 2, where it will first be assumed that a definite, constant, predetermined voltage is impressed or superimposed upon the output circuits of all tubes 4 under test when they are successively connected with their common input circuit and their common output circuit before described, and where the resulting alternating component of plate current is rectified. This rectified current actuates the direct-current indicating instrument 12 which responds to the rectified current.

The impressed voltage conditions may readily be brought about by adjusting the slider 36 along the voltage divider 38, which is traversed by a constant alternating current. This can be conveniently accomplished, for example, by making the resistance of the resistor 38 small compared with the dynamic internal plate resistance of the tube 4 under test. The current of the output circuit of the tubes 4 under test will, of course, for practical purposes, be inversely proportional to the total impedances of the output circuit. As all other impedances of the output circuit are preferably exceedingly small compared to the internal plate resistance, the current in the output circuit which is proportional to the voltage in the output circuit of the said tube 4 will, therefore, for practical purposes, be inversely proportional to the internal plate resistances of the respective tubes. This facilitates reading direct values of the dynamic characteristics on the direct-current indicating instrument 12; for, when different tubes 4, having different dynamic characteristics, such as internal plate resistances, are connected into the circuit, the meter 12 which responds to the rectified component of current, will indicate the different internal plate resistances, or other dynamic characteristics if the circuit is properly adjusted, by different deflections, assuming the impedances of the corresponding input and output circuits to be substantially constant. With proper calibration of the meter 12, therefore, it is possible to measure an alternating current impulse independent of the source 2 of voltage and as a direct indication of the dynamic characteristic desired.

It is not, however, essential that the other resistances associated with the internal plate resistance be negligible in comparison therewith. In fact, it may be desirable, under some conditions, so to arrange the circuits that the impedance, looking into the winding 50 of the transformer 52, shall not be negligible compared with the internal plate resistance of the tube 4 under test. Thus, if the impedance looking into the transformer 52 were of the same order of magnitude as the internal plate resistance of the tube 4 under test, the only effect would be to cause a different calibration of the scale of the instrument 12.

A resistor 54 may be employed, connected between the grid 44 and the filament 42. The resistance of the resistor 54 may be of such value that the internal impedance from the grid 44 to the filament 42 is large by comparison. This decreases the effect of the internal input impedances of different tubes 30, with the result that one detector tube 30 may be replaced by another tube without upsetting the characteristics of the device due to a change in the impedance in the circuits into which the transformer 52 works.

The measurement of mutual conductance may be accomplished by the use of the circuit of Fig. 3, as will now be described. It will first be assumed that a definite, constant or predetermined voltage is impressed or superposed upon the input circuits of all tubes 4 under test, when they are successively connected with their common input circuit and their common output circuit before described. This may readily be brought about by adjusting the slider 36 to a proper point on the voltage divider 38, which is traversed by a constant current. With the same constant impressed voltage for all tubes 4, under test, the current of the output circuit of the tube 4 will, of course, for practical purposes, be inversely proportional to the total impedance of the circuit, and proportional to the amplification coefficient $\mu$ of the tube. This facilitates reading direct values of the dynamic characteristics upon the direct-current indicating instrument 12 which responds to the rectified alternating current in the plate circuit of tube 4; for when different tubes 4, having different dynamic characteristics, are connected into the circuit, the meter 12 will indicate the difference of mutual conductance or other dynamic characteristic, if the circuit is properly adjusted by different connections. As the deflections of the meter 12 will be a constant function of the mutual conductances or plate resistances of different tubes 4, depending on the particular circuit connection, for example, with a detector or rectifying device where the rectified or response current is proportional to the square of the impressed voltage, the deflection of the meter 12 will be proportional to the square of the mutual conductance. The values of the mutual conductances or plate resistances of these different tubes 4 may thus be read directly upon the direct-current meter 12, assuming the impedances of the common input and output circuits to be substantially constant. With proper calibration of the meter 12, therefore, it is possible to measure a direct-current impulse which is the result of the rectification of an alternating current or alternating voltage. The direct-current impulse is independent of the source 2 of voltage and is a direct indication of the dynamic characteristic desired.

The use of a constant impressed or superposed voltage in the output circuit of the tube 4 is not, however, essential. In accordance with a second way of measuring the dynamic characteristics, the voltage divider 38, instead of the meter 12, may be calibrated in terms of the dynamic characteristic. The position of the slider 36, and not the indicating needle of the meter 12, would then indicate directly the dynamic characteristic of the tube 4 by adjusting 36 for constant deflection of the meter 12. The calibration of the voltage divider may be effected in many ways within the scope of the invention.

In the case of the measurement of the dynamic resistance, various known resistances could be inserted in series with the said known tube 4, and the slide wire 36 adjusted so as to always give the same deflection on the meter 12. These adjusted positions of the slide wire would correspond to calibrations of the voltage divider 38. Of course, in the case of the dynamic-resistance indication, if the internal impedance of the tube 4 dominates, it will only be necessary to check the deflection of the meter by the insertion of one known resistor, since the position of the slider 36 will be disposed so as to subtend a resistance proportional to $r_p$.

To determine the internal plate resistance of any unknown tube 4, the latter would be substituted in the circuit for the said known tube 4, and the slider would be adjusted until the meter 12 indicated the predetermined deflection. The internal plate resistance of the unknown tube 4 would then be read off on the calibrated scale of the voltage divider 38.

To compensate for changes in the characterics of different tubes 30, where a calibrated voltage divider is used, a dummy resistor (not shown) could be substituted for the tube 4. The slider 36 could be moved to the proper reading to agree with the dummy resistor, and the rectifying or detecting efficiency of the device 30 could then be adjusted by means of the variable resistor 48, so that the needle of the meter 12 would be deflected to a convenient index on the scale. The method of determining the internal plate resistance would otherwise be the same.

In the operation of the system, as thus far explained, a calibrated tube 4, having a definite, known, dynamic characteristic, is first inserted in the first stage of the device. If the dynamic nonlinear sensitivity characteristics of the device 30 are not known, the resistor 48 may be adjusted until the indicating meter 12 reads the value of the desired dynamic characteristic, corresponding to the particular circuit connection, equal to that of the calibrated tube 4. The device is now ready for the measurement of that particular dynamic characteristic of various tubes 4, and the meter 12 will indicate such dynamic characteristics directly provided the scale is calibrated to correspond to the particular nonlinear characteristic of the device 30 utilized.

It is usually found advantageous to operate different detector tubes 30 in as nearly the same way as practicable in order that the relationship between the alternating-voltage input and the rectified-current output shall obey, as nearly as possible, the same law for different tubes 30. In this way, the scale of the meter 12 need then be checked at only one point prior to operation.

According to the invention disclosed in application Serial No. 561,405, filed September 5, 1931, however, which matured into Patent 2,031,926 on the same February 25, 1936, it is possible to calibrate the device, and thus effect these dynamic-characteristic measurements, even though the first tube 4 is not previously calibrated, so that its dynamic characteristic is not previously known. Thus, to start with, a calibrated tube 4 having a definite, known mutual conductance (or other dynamic characteristic) could be first inserted in the first stage of the device, and the slide wire 36 could then be adjusted to yield a definite deflection on the meter 12. The position of the slide wire 36 would then indicate the value of the mutual conductance of that particular tube 4. Various known resistances could then be inserted in series with the said known tube 4, and the slide wire 36 adjusted so as always to give the same deflection on the meter 12. These adjusted positions of the slide wire 36 would correspond to calibrations of the voltage divider 38.

From what has been said, the same apparatus, therefore, may, by different circuit connections, be employed to indicate, by direct deflection, for example, in mutually exclusive fashion, the various dynamic characteristics of the vacuum tube 4. The connections may readily be changed by means of suitable switches, so as to provide the input circuits and in effect the corresponding output circuits of any of Figs. 1, 2 and 3, as fully described in my said Patent 2,031,923, and as will be understood by reference to Fig. 4, where the switches are shown, for simplicity of illustration, at 60, 70, 80, 90, 100, 102 and 104. The switches may, however, be incorporated into a single unit.

The switch 60 comprises a contact member 64 that may make contact either with an upper, spring contact member 65, or a lower contact member 66. When it makes contact with the upper contact member 65, the slider 36 is connected by the contact members 64 and 65 to the grid 8, as in Figs. 1 and 3. At such time, a spring contact arm 77 of switch 70 is maintained out of engagement with the contact member 72, but it is engaged with a contact member 78 to provide a connection from the filament 6, by way of the contact members 77 and 78 and a common lead 61, to the lower end of the secondary winding 24, also as in Figs. 1 and 3. Consider now the switch 80 comprising a spring contactor 82 making contact with either of contact members 84, 86. The spring contact member 82 should be in contact with contact member 86. In this position of the switches 60, 70 and 80, any voltage subtended on the voltage divider 38 by the slider 36 will be applied between the filament and the grid of the tube 4 (corresponding to conditions of Figs. 1 and 3).

To obtain the Fig. 2 connections of the slider 36, the contact member 64 of switch 60 is lowered into contact with the contact member 66, the grid will then return directly to the filament 6, thus opening contact between contact members 64 and 65. The contact member 82 of switch 80 is raised into contact with contact member 84 (opening contact between members 86 and 82). The slider 36 will then become connected through the contact members 82 and 84 to the plate 10. If also the spring contact arm 77 of switch 70 is, at the same time, lowered into contact with the contact arm 72, (instead of making contact with contact member 78) connection will be made between the lower end of the secondary winding 24 and the filament through the primary winding 50 of the transformer 52, as in Fig. 2.

In this position of the switches 60, 70 and 80, the grid 8 returns directly to the filament 6, through the contact members 64 and 66, and the voltage subtended by the slider 36 on the voltage divider 38 is now applied in series with the plate 10 and the filament 6 as in Fig. 2.

Thus, with the switches 60, 70 and 80 in the first position described, namely, the member 64 engaging the contact member 65, (and with the contact members 64 and 66 open), with the contact member 77 engaging the contact member 78 (and with the contact members 72 and 77 open), and with contact members 82 and 86 closed (and with contact members 82 and 84 open), the input-circuit connections of the tube 4 corresponds to Figs. 1 and 3. With the switches 60, 70 and 80 in the second position described, namely, with the member 64 engaging the contact member 66 (and with contact members 64 and 65 open), the contact member 77 engaging the contact member 72 (the contact between members 77 and 78 being open), and the contact member 82 engaging the contact member 84 (the contact members 82 and 86 being open), the input-circuit connections of the tube 4 correspond to Fig. 2.

With contacts 82 and 86 of switch 80 closed and contacts 77 and 78 of switch 70 closed, considering now switches 90, 100, 102 and 104, with contact members 92 and 94 closed (contact members 92 and 96 open) and with switch 100 closed (switches 102 and 104 open) the connections of the output circuits of tube 4 under test correspond to Fig. 1. Under the same conditions of switch 80 but with contact members 92 and 96 closed (contact members 92 and 94 open) and with switch 104 closed (switches 100 and 102 open) the connections of the output circuit of tube 4 under test correspond to Fig. 3. With contacts 82 and 84 of switch 80 closed and contacts 72 and 77 of switch 70 closed and with switch 102 closed (switches 100 and 104 open) the output circuit connections of tube 4 correspond to Fig. 2.

Figure 4:
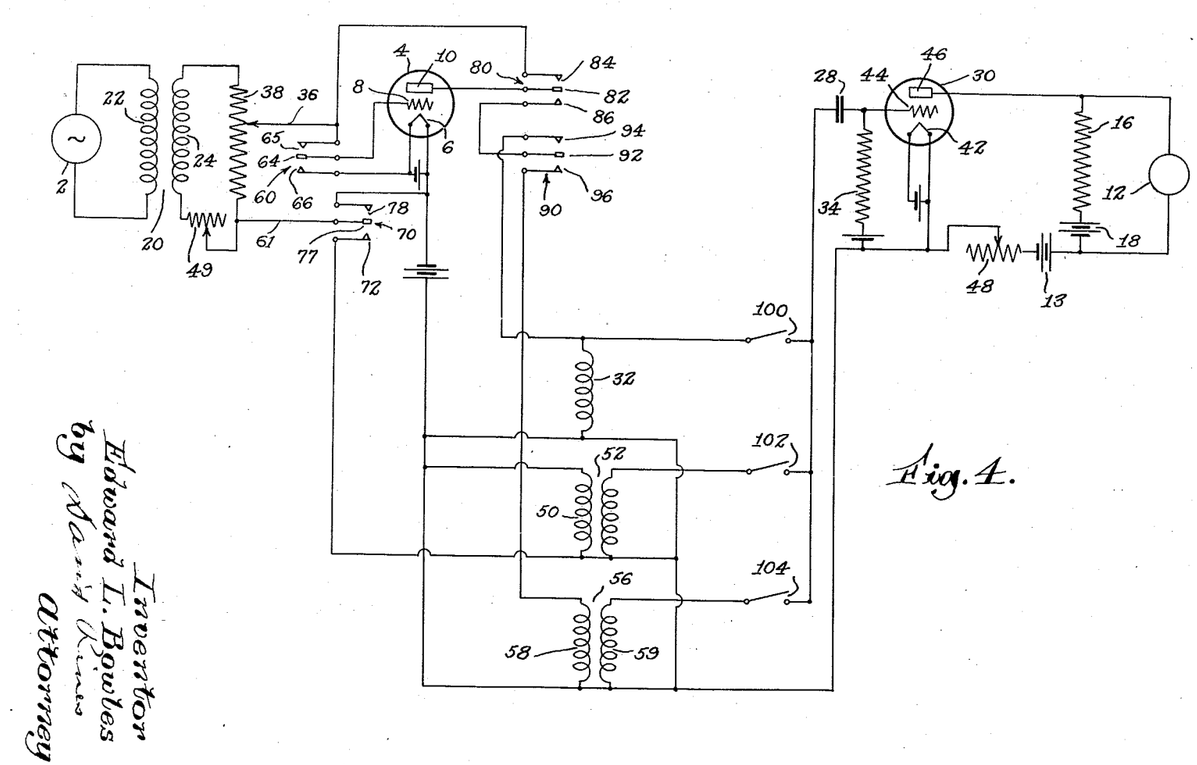
Fig. 4 is a similar diagrammatic view of a complex system embodying the circuits of Figs. 1, 2 and 3 which is adapted to produce in effect any one of the said circuits of Figs. 1, 2 and 3 in mutually exclusive fashion by manipulation of switches.

From this description of the connections effected by the switches 60, 70, 80, 90, 100, 102 and 104 of Fig. 4, it will be clear that if it is desired to determine the amplification coefficient $\mu$ of tube 4 under test, it is only necessary to close contact members 64—65 of switch 60, 77—78 of switch 70, 82—86 of switch 80, 92—94 of switch 90 and switch 100 (opening 64—66 of switch 60, 77—72 of switch 70, 82—84 of switch 80, 92—96 of switch 90 and switches 102 and 104). Again, if it is desired to measure the mutual or transconductance $g_m$ of tube 4 under test, the switches 60, 70 and 80 are left in the same position as for the measurement of the amplification coefficient $\mu$ mentioned above, but the contact members 92—96 of switch 90 and switch 104 are closed. Finally, if it is the dynamic internal plate resistance $r_p$ of the tube 4 under test that it is desired to determine, contact members 64—66 of switch 60, 72—77 of switch 70, 82—84 of switch 80 and switch 102 are closed (contact members 64—65, 77—78 and switches 100 and 104 being open).

In some cases, it may be possible to utilize a single transformer in place of the two transformers 52 and 56.

The tubes may be conveniently connected in and out of circuit by means of a suitable socket or other receptacle (not shown) that is permanently connected in circuit.

It is convenient to provide the apparatus with a local power source, such as an oscillator having a frequency of 1000 or 2000 cycles per second. This has two advantages, among others. First, the transformers, chokes and the like, may then be more economically designed than when intended for use at 60 cycles; and secondly, the system is then useable even where standard 60-cycle frequencies are not available.

For definiteness, in the claims the term "alternating-current impulse" or its equivalent will be employed to denote either an alternating voltage or an alternating current.

Modifications will readily occur to persons skilled in the art and all such are intended to be embraced in the appended claims.

What is claimed is:
1. In the process of determining the mutual conductance of a vacuum tube, the method which comprises impressing a predetermined alternating-current voltage upon the grid circuit of said tube, rectifying the alternating component resulting in the plate circuit from said impressed voltage, and measuring the rectified current.

2. The method of determining the plate resistance of an electron tube comprising energizing the filament and the plate of a tube, superposing an alternating potential on the plate, rectifying the resulting alternating component of the plate current, and indicating the value of said rectified component in terms of plate resistance.

3. In an electron tube tester, the combination of means for energizing the electron tube with an alternating-current source for superposing an alternating potential on the plate, a rectifier for rectifying the resulting alternating component of the plate current, and a meter calibrated in terms of plate resistance for measuring said rectified component.

4. In an electron tube tester, the combination of a direct-current milliammeter having scales calibrated in terms of mutual conductance and plate resistance, with a rectifier for rectifying predetermined components of current passing through said milliammeter, means for energizing the tube and superposing an alternating potential on an electrode of the tube, and selective switch means for impressing said alternating potential on the grid or plate to measure mutual conductance or plate resistance with said milliammeter.

5. The method of determining characteristics of each of a plurality of electron tubes each having filament, plate and grid electrodes that comprises superposing an alternating potential on one electrode to produce a periodically varying electrical condition in the tube, rectifying the alternating component of the electrical current in the circuit of another electrode, and indicating the value of the rectified alternating component to determine a characteristic of the tube.

6. Apparatus for measuring the amplification coefficient of a space-current device having an input circuit and an output circuit having, in combination, means for impressing a voltage upon the input circuit, an impedance in the output circuit of value so high that the internal plate resistance of the device is negligible by comparison, a non-linear circuit element having an input circuit and an output circuit, the input circuit of the non-linear element being connected with the output circuit of the space-current device, and means for measuring the voltage of the output circuit of said non-linear element.

7. Apparatus for measuring the amplification coefficient of a space-current device having an input circuit and an output circuit having, in combination, means for impressing a voltage upon the input circuit, means for adjusting the voltage, an impedance in the output circuit of value so high that the internal plate resistance of the device is negligible by comparison, a non-linear circuit element having an input circuit connected across the impedance and an output circuit, means for compensating for the rectifying efficiency of the element, and means for measuring the voltage of the output circuit of said non-linear element.

8. A method of measuring a dynamic characteristic of each of a plurality of space-current devices each having a plurality of electrodes that comprises impressing a constant alternating voltage between two electrodes of each device, rectifying an alternating-current impulse of the device, and measuring the direct-current, rectified impulse.

9. Apparatus for measuring, in mutually exclusive fashion, a plurality of the dynamic characteristics of a plurality of space-current devices, having, in combination, a plurality of input circuits and a plurality of corresponding output circuits with which the space-current devices are adapted to be successively connected, each input circuit and its corresponding output circuit corresponding to one of the dynamic characteristics that it is desired to measure, means for impressing an alternating voltage upon the space-current devices when so connected, a non-linear circuit element having a common input circuit and a common output circuit, means for connecting the input circuit of said non-linear element with the output circuit of the space-current devices, and means for measuring a direct-current impulse of the said non-linear element.

10. A method of measuring the dynamic internal plate resistance of each of a plurality of space-current devices that comprises successively connecting the space-current devices with a common input circuit and a common output circuit, impressing a constant alternating voltage upon the output circuit, rectifying an alternating-current impulse of the output circuit, and measuring the rectified alternating-current impulse.

11. A method of measuring the dynamic internal plate resistance of each of a plurality of space-current devices that comprises successively connecting the space-current devices with a common input circuit and a common output circuit, impressing an alternating voltage upon the output circuit, rectifying an alternating-current impulse of the output circuit, adjusting the impressed voltage to render the rectified current impulse constant, and measuring the adjusted impressed voltage.

12. Apparatus for measuring the dynamic internal plate resistance of each of a plurality of space-current devices having, in combination, a common input circuit and a common output circuit with which the space-current devices are adapted to be successively connected, means for impressing a constant alternating voltage upon the output circuit, means for rectifying an alternating-current impulse of the output circuit, and means for measuring the rectified current impulse.

13. Apparatus for measuring the dynamic internal plate resistance of each of a plurality of space-current devices having, in combination, a common input circuit and a common output circuit for the space-current devices, the resistances in the output circuit being small compared to the said dynamic internal plate resistances, means for successively connecting the space-current devices with the input circuit and the output circuit, means for impressing an alternating voltage upon the output circuit, means for rendering the impressed voltage constant, a non-linear circuit element having an input circuit and an output circuit, means for connecting the input circuit of said non-linear element with the output circuit of the space-current devices to rectify the voltage of the output circuit of the space-current devices, and means for measuring the current of the output circuit of said non-linear element.

14. Apparatus for measuring the dynamic internal plate resistance of each of a plurality of space-current devices having, in combination, a common input circuit and a common output circuit for the space-current devices, the impedance in the output circuit being of the same order of magnitude as the said dynamic internal plate resistance, means for successively connecting the space-current devices with the input circuit and the output circuit, means for impressing an alternating voltage upon the output circuit, means for rendering the impressed voltage constant, a non-linear circuit element having an input circuit and an output circuit, means for connecting the input circuit of said non-linear element with the output circuit of the space-current devices to rectify the voltage of the output circuit of the space-current devices, and means for measuring the current of the output circuit of said non-linear element.

15. Apparatus for measuring the dynamic internal plate resistance of each of a plurality of space-current devices having, in combination, a common input circuit and a common output circuit with which the space-current devices are adapted to be successively connected, means for impressing an alternating voltage upon the output circuit, a non-linear circuit element having an input circuit connected with the said output circuit and having also an output circuit, means for indicating a rectified impulse of the output circuit of said non-linear element, and means for varying the impressed alternating voltage to produce a constant indication of the indicating means, the adjustable means being calibrated in terms of the said dynamic internal plate resistance.

16. A method of measuring the mutual conductance of each of a plurality of space-current devices each externally connected so as to have an input circuit and an output circuit, the impedance in the output circuit having a value so low that it is negligible compared with the internal plate resistances of the devices, the said method comprising impressing a constant voltage upon the input circuit of each device, rectifying the current of the output circuit of the said device, and measuring the rectified current.

17. A method of measuring the mutual conductance of each of a plurality of space-current devices each externally connected so as to have an input circuit and an output circuit, the impedance in the output circuit having a value so low that it is negligible compared with the internal plate resistances of the devices, the said method comprising rectifying the voltage in the output circuit of each device, maintaining the rectified voltage constant, and measuring the voltage in the input circuit of the said device.

18. Apparatus for measuring the mutual conductance of each of a plurality of space-current devices having, in combination, an input circuit, an output circuit, the impedance in the output circuit having a value so low that it is negligible compared with the internal plate resistances of the devices, means for successively connecting the space-current devices with the input circuit and the output circuit, means for impressing an alternating voltage upon the input circuit of each device, a non-linear circuit element for rectifying the current of the output circuit of the said device, and means for measuring the rectified current.

19. Apparatus for measuring a dynamic characteristic of each of a plurality of electric devices having, in combination, a common input circuit and a common output circuit with which the electric devices are adapted to be successively connected, the input and output circuits having substantially constant impedances, means for impressing an alternating voltage upon the electric devices when so connected, a non-linear circuit element having an input circuit and an output circuit, means for connecting the input circuit of said non-linear element with the output circuit of the electric devices to rectify the voltage of the output circuit of the electric devices, means for indicating a rectified-current impulse of the output circuit of said non-linear element, and means for varying the impressed alternating voltage to produce a constant indication of the indicating means, the last-named means being calibrated in terms of the dynamic characteristic to be measured.

20. Apparatus for measuring a dynamic characteristic of each of a plurality of space-current devices each provided with a plurality of electrodes having, in combination, a common input circuit and a common output circuit with which the electrodes of the space-current devices are adapted to be successively connected, the input and the output circuits having substantially constant impedances, means for impressing an alternating voltage upon the space-current devices when so connected, a non-linear circuit element having an input circuit and an output circuit, means for connecting the input circuit of said non-linear element with the output circuit of the space-current devices to rectify the voltage of the output circuit of the space-current devices, means for indicating a rectified-current impulse of the output circuit of said non-linear element and means for varying the impressed alternating voltage to produce a constant indication of the indicating means the last-named means being calibrated in terms of the dynamic characteristic to be measured.

21. In an electron tube tester for determining dynamic coefficients, the combination of a direct-current milliammeter, a rectifier for rectifying predetermined components of current passing through said milliammeter, a tube under test having electrodes, means for energizing the tube and superposing an alternating potential on an electrode of the tube, and selective switch means for impressing said alternating potential on a particular electrode, whereby a particular dynamic coefficient is measured.

22. A method of measuring the amplification coefficient of a space-current device externally connected so as to have an input circuit and an output circuit, the output circuit having an impedance of value so high that the internal plate resistance of the device is negligible by comparison, the said method comprising impressing a voltage upon the input circuit, rectifying the voltage across the impedance, and measuring the rectified voltage.

23. Apparatus for measuring the amplification coefficient of a space-current device having an input circuit and an output circuit having, in combination, means for impressing a voltage upon the input circuit, an impedance in the output circuit of value so high that the internal plate resistance of the device is negligible by comparison, a non-linear circuit element having an input circuit in which the impedance is connected and an output circuit containing a variable impedance, and means for measuring the voltage of the output circuit of the non-linear element.

24. Apparatus for measuring a dynamic characteristic of each of a plurality of space-current devices having, in combination, a common input circuit and a common output circuit with which the space-current devices are adapted to be successively connected, the input and the output circuits having substantially constant impedances, means for impressing an alternating voltage from a source of voltage upon the space-current devices when so connected, a non-linear circuit element having an input circuit and an output circuit, means for connecting the input circuit of said non-linear element with the output circuit of the space-current devices to rectify the voltage of the output circuit of the space-current devices, and means independent of the source of voltage for measuring a rectified-current impulse of the output circuit of the non-linear element as a direct indication of the value of the dynamic characteristic.

25. Apparatus for measuring a dynamic characteristic of each of a plurality of space-current devices having, in combination, a common input circuit and a common output circuit with which the space-current devices are adapted to be successively connected, the input and the output circuits having substantially constant impedances, means for impressing an alternating voltage from a source of voltage upon the space-current devices when so connected, a non-linear circuit element having an input circuit and an output circuit, means for connecting the input circuit of said non-linear element with the output circuit of the space-current devices to rectify the voltage of the output circuit of the space-current devices, means for rendering the impressed voltages constant, and means independent of the source of voltage for measuring a rectified-current impulse of the output circuit of the non-linear element as a direct indication of the value of the dynamic characteristic.

26. Apparatus for measuring, in mutually exclusive fashion, the dynamic internal plate resistance and another dynamic characteristic of a plurality of space-current devices having, in combination, two input circuits, two corresponding output circuits, the space-current devices being adapted to be successively connected with one or the other input circuit and its corresponding output circuit, means for impressing an alternating voltage upon the space-current devices when so connected, means for adjusting the impressed voltage to a value suitable for measuring the dynamic internal plate resistance and the other dynamic characteristic, respectively, when the space-current device is connected with one or the other input circuit and the corresponding output circuit, respectively, a non-linear circuit element having an input circuit and an output circuit, means for connecting the input circuit of said non-linear element with the output circuit of the space-current devices to rectify the voltage of the output circuit of the space-current devices, and means for measuring a rectified-current impulse of the output circuit of the non-linear circuit element.

27. Apparatus for measuring a dynamic characteristic of each of a plurality of space-current devices having, in combination, a common input circuit and a common output circuit with which the space-current devices are adapted to be successively connected, the input and the output circuits having substantially constant impedances, a voltage divider in one of the circuits, means for impressing an alternating voltage from a source of voltage upon the voltage divider, means for adjusting the voltage divider to maintain constant the voltage impressed upon the space-current devices, a non-linear circuit element having an input circuit and an output circuit, means for connecting the input circuit of said non-linear element with the output circuit of the space-current devices to rectify the voltage of the output circuit of the space-current devices, and means independent of the source of voltage for measuring a rectified-current impulse of the output circuit of the non-linear element as a direct indication of the value of the dynamic characteristic.

28. In an electric system comprising a common input circuit and a common output circuit and also a rectifier having an input circuit and an output circuit, the rectifier input circuit being connected with the common output circuit to rectify the voltage of the common output circuit, the method of measuring, in mutually exclusive fashion, a plurality of the dynamic characteristics of each of a plurality of space-current devices that comprises successively connecting each space-current device to the common input circuit and the common output circuit, adjusting the impedance of the common output circuit and impressing a substantially constant alternating voltage upon one of the common input and output circuits to render the system sensitive to the measurement of one dynamic characteristic only and insensitive to the measurement of any other dynamic characteristic, maintaining the impedance of said input and output circuits substantially constant, and measuring a rectified-current impulse of the rectifier output circuit as a direct indication of the value of the said one dynamic characteristic.

29. A method of measuring a dynamic characteristic of each of a plurality of space-current devices each having a plurality of electrodes that comprises successively connecting the space-current devices with a common input circuit and a common output circuit, maintaining the impedances of the input and output circuits constant, impressing a constant alternating voltage between two electrodes of each space-current device when so connected, rectifying an alternating-current impulse between two electrodes of each device when so connected, and measuring the rectified alternating-current impulse.

30. Apparatus for measuring the dynamic internal plate resistance of each of a plurality of space-current devices having, in combination, a common input circuit and a common output circuit with which the space-current devices are adapted to be successively connected, a voltage divider in the output circuit, means for impressing an alternating voltage upon the voltage divider, means for adjusting the voltage divider to maintain constant the alternating current in the output circuit, means for rectifying an alternating-current impulse of the output circuit, and means for measuring the voltage adjustably impressed upon the voltage divider.

31. Apparatus for measuring the dynamic internal plate resistance of each of a plurality of space-current devices having, in combination, a common input circuit and a common output circuit with which the space-current devices are adapted to be successively connected, a voltage divider in the output circuit, means for impressing an alternating voltage upon the voltage divider, means for adjusting the voltage divider to maintain constant the voltage impressed upon the voltage divider, means for rectifying an alternating-current impulse of the output circuit, and means for measuring the rectified alternating-current impulse.

32. Apparatus for measuring the dynamic internal plate resistance of each of a plurality of space-current devices having, in combination, a common input circuit and a common output circuit with which the space-current devices are adapted to be successively connected, the resistances in the output circuit being small compared to the said dynamic internal plate resistance, means for impressing an alternating voltage upon the output circuit, means for rectifying an alternating-current impulse of the output circuit, and means for measuring the rectified impulse.

33. Apparatus for measuring the dynamic internal plate resistance of each of a plurality of space-current devices having, in combination, a common input circuit and a common output circuit with which the space-current devices are adapted to be successively connected, the impedance in the output circuit being of the same order of magnitude as the said dynamic internal plate resistance, means for impressing an alternating voltage upon the output circuit, means for rectifying an alternating-current impulse of the output circuit, and means for measuring the rectified impulse.

34. Apparatus for measuring the dynamic internal plate resistance of each of a plurality of space-current devices having, in combination, a common input circuit and a common output circuit with which the space-current devices are adapted to be successively connected, a transformer having a primary winding adapted to be connected with a source of alternating current and a secondary winding, means for connecting the output circuit with the secondary winding to cause the voltage of the source to become impressed upon the output circuit, a non-linear circuit element having an input circuit and an output circuit, means for connecting the input circuit of the non-linear circuit element with the output circuit of the space-current devices to rectify an alternating-current impulse of the output circuit of the space-current devices, and means for measuring the rectified-current impulse.

35. Apparatus for measuring the mutual conductance of each of a plurality of space-current devices having, in combination, an input circuit, an output circuit, the impedance in the output circuit having a value so low that it is negligible compared with the internal plate resistances of the devices, means for successively connecting the space-current devices with the input circuit and the output circuit, means for rectifying the voltage in the output circuit of each device, means for maintaining the rectified voltage constant, and means for measuring the voltage in the input circuit of the said device.

36. Apparatus for measuring the mutual conductance of each of a plurality of space-current devices having, in combination, an input circuit, an output circuit, the impedance in the output circuit having a value so low that it is negligible compared with the internal plate resistances of the devices, means for successively connecting the space-current devices with the input circuit and the output circuit, a voltage divider in the input circuit, means for adjusting the voltage divided to maintain the voltage in the input circuit of each device constant, a non-linear circuit element for rectifying the current of the output circuit of each device, and means for measuring the rectified current.

37. Apparatus for measuring the mutual conductance of each of a plurality of space-current devices having, in combination, an input circuit, an output circuit, the impedance in the output circuit having a value so low that it is negligible compared with the internal plate resistances of the devices, means for successively connecting the space-current devices with the input circuit and the output circuit, a voltage divider in the input circuit, means for maintaining the voltage in the output circuit of each device constant, a non-linear circuit element for rectifying the current of the output circuit of each device, and means for adjusting the voltage divider to measure the voltage in the input circuit of the said device.

38. Apparatus for measuring the mutual conductance of each of a plurality of space-current devices having, in combination, an input circuit, an output circuit, the impedance in the output circuit having a value so low that it is negligible compared with the internal plate resistances of the devices, means for successively connecting the space-current devices with the input circuit and the output circuit, a transformer having a primary winding adapted to be connected with the source of alternating current and a secondary winding, means for connecting the input circuit of each device with the secondary winding to cause the voltage of the source to become impressed upon the said input circuit, a non-linear circuit element having an input circuit and an output circuit, means for connecting the input circuit of the non-linear circuit element with the output circuit of the space-current devices to rectify the current of the output circuit of the space-current devices, and means for measuring the rectified current in the output circuit.

39. Apparatus for measuring the mutual conductance of each of a plurality of space-current devices having, in combination, an input circuit, an output circuit, the impedance in the output circuit having a value so low that it is negligible compared with the internal plate resistances of the devices, means for successively connecting the space-current devices with the input circuit and the output circuit, means for impressing an alternating voltage from a source of voltage upon the input circuit of each device, a non-linear circuit element for rectifying the current of the output circuit of each device, and means independent of the source of voltage for measuring the current in the output circuit of the said device as a direct indication of the value of the mutual conductance.

40. Apparatus for measuring the mutual conductance of each of a plurality of space-current devices having, in combination, an input circuit, an output circuit, the impedance in the output circuit having a value so low that it is negligible compared with the internal plate resistances of the devices, means for successively connecting the space-current devices with the input circuit and the output circuit, means for impressing an alternating voltage from a source of voltage upon the input circuit of each device, means for rendering the impressed voltages constant, a non-linear circuit element for rectifying the current of the output circuit of each device, and means independent of the source of voltage for measuring the rectified current in the output circuit of the said device as a direct indication of the value of the mutual conductance.

EDWARD L. BOWLES.